United States Patent Office 3,240,705
Patented Mar. 15, 1966

3,240,705
POLYTHIOBIS(HALOALKYLPHENOLS)
Harold D. Orloff, Oak Park, Mich., assignor to Ethyl Corporation, New York, N.Y., a corporation of Virginia
No Drawing. Filed Apr. 15, 1963, Ser. No. 272,835
9 Claims. (Cl. 252—48.4)

This application is a continuation-in-part of application Serial No. 826,105, filed July 10, 1959, now U.S. Patent 3,092,585.

This invention relates to new compositions of matter and more particularly to new sulfur and halogen-containing materials and polythiobis(haloalkylphenols).

Some phenolic compounds have found utility as antioxidants in various organic media. The ability of such compounds to act as antioxidants depends on a delicate balance of properties such as molecular weight, solubility, steric hindrance of the hydroxyl group and others which have yet to be defined.

Certain sulfur and chlorine-containing compounds have found utility as anti-wear and extreme pressure agents. Their effectiveness is due in part to the affinity of such compounds for metal surfaces. Bearings in contact with an oil containing such compounds are protected from wear by the coating action of the additive. The anti-wear agent coats the bearing and thereby removes it physically from the oil.

Thus the mechanism by which the two types of additives function can be contrasted. On the one hand, antioxidants function by intimately co-acting with the medium, for example oil, to react with oxygen and peroxides, thus stabilizing the oil. On the other hand, anti-wear agents are more effective when their affinity for metal surfaces is greater than their affinity for oil. They do not act chemically as do antioxidants with oxygen and peroxides, but rather they act physically on metal surfaces or bearings in the oil. Attempts have been made in the past to find antioxidants which will also act as anti-wear agents. Such a task is made difficult by the fact that the respective functions are accomplished by contrasting mechanisms. In order to accomplish such a task a delicate balance must be achieved whereas the solubility, molecular weight, configuration, affinity and other properties of the compounds must be such as to allow the compound to function in both capacities. This is not an easy task. Previous attempts have resulted in compounds which were not effective in either capacity.

It is an object of this invention to provide new compositions of matter. A further object is to provide highly effective sulfur and chlorine-containing phenolic compounds. Another object is to provide a process for preparing these sulfur and chlorine-containing materials. Still another object is to provide new compositions of matter which comprise various organic media, particularly mineral oils, containing the sulfur and chlorine-containing material of this invention. Other objects of this invention will be apparent from the ensuing description.

In application Serial Number 826,105, filed July 10, 1959, and entitled Improved Lubricating Oils, I describe the preparation of a 2,2'-thiobis-(4-halo-6-alkylphenol) where the alkyl group is alpha-branched and has from 3 to about 12 carbon atoms. Such compouds are shown to have utility as lubricating oil antioxidants. These compounds are prepared by the reaction of a 4-halo-6-alkylphenol with a sulfur chloride in an inert solvent, followed by recovery from the residue of a 2,2'-thiobis-(4-halo-6-alkylphenol).

It has now been discovered that the residue, from which the 2,2'-thiobis-(4-halo-6-alkylphenol) is recovered, also possesses outstanding antioxidant properties and, in addition, possesses outstanding anti-wear properties. Further, it has been found that when this residue is further treated a 2,2'-trithiobis-(4-halo-6-alkylphenol) precipitates. This latter trithiobisphenol not only is a highly effective antioxidant but, unlike the corresponding monothiobis compound also possesses outstanding anti-wear properties. Thus material has been discovered which possesses that delicate balance of properties which enables it to perform as an anti-oxidant and as an anti-wear agent.

This duality of function is demonstrated by subjecting the above two types of compounds to both antioxidant and anti-wear tests. The antioxidant test was an oxygen obsorption test conducted using a highly refined mineral derived oil having a viscosity index of 106.5 and a viscosity of 87.1 SUS at 100° F. The oil was charged in separate samples (with and without the additives being tested) to an apparatus for measuring the oxidative stability of the oil. The apparatus consisted of a glass vessel having a 12 milliliter capacity and an inlet tube which was connectable to a mercury manometer. After the oil was charged the vessel was flushed with oxygen at atmospheric pressure and then connected to the mercury manometer. The vessel was then immersed in a constant temperature bath at 150° C. whereupon changes in the oxygen pressure were indicated on the manometer. The manometer was observed until a rapid pressure drop in the vessel occurred. The time from immersion to the time of the pressure drop is the induction period of the oil. To all samples, ferric hexoate was added to catalyze oxidation and make the tests more severe. The concentration of the iron salt was adjusted to 0.05 percent based on $Fe_2O_3$. One milliliter of the oil was charged to the apparatus in each test. The concentration of additive in the oil was $1.0 \times 10^{-2}$ moles per liter. In tests of this nature, the base oil has an induction period of from two to three minutes, showing that it is completely unstable to oxidative deterioration at 150° C. The results of these tests are listed in Table I.

The anti-wear test was a modified Polyveriform Oxidation Stability Test. The normal Polyveriform Oxidation Stability Test is described in the paper entitled "Factors Causing Lubricating Oil Deterioration in Engines," Ind. and Eng. Chem., Anal. Ed. 17, 302 (1945). See also "A Bearing Corrosion Test for Lubricating Oils and Its Correlation With Engine Performance," Anal. Chem. 21, 737 (1949). The test equipment and procedure employed are discussed in the first paper cited above.

One modification was that the steel sleeve and copper test piece described in the publication were omitted from the apparatus. In these tests an initially additive-free 105.5 V.I. solvent-refined SAE–20 crankcase oil was used.

The principle conditions consisted of passing 48 liters of air per hour through the test oil for a total period of 120 hours while maintaining the oil at a temperature of 300° F. Oxidation of the oil was further promoted by employing as an oxidation catalyst 0.10 percent by weight of lead bromide, based upon the weight of oil employed. In addition a copper-lead bearing was submerged in the oil as an additional catalyst and as a means for determining the anti-wear effectiveness of the additive employed. At the end of the test the loss in weight of the copper lead bearing was determined. Such a determination gives good correlation with actual engine tests.

Lubricating oils were prepared by blending 0.5 weight percent of additive, based on the weight of the test oil, with individual portions of the test oil. These compositions were then subjected to the above stringent test. The results are shown in Table I.

TABLE I.—TEST RESULTS

| Compounds | Induction Time, Min. | Bearing Weight Loss, mg.[1] |
|---|---|---|
| 2,2'thiobis-(4-chloro-6-tert-butylphenol) | 1,095 | 1,007 |
| 2,2'trithiobis-(4-chloro-6-tert-butylphenol) | 902 | 47 |

[1] An average of two tests.

The results in Table I demonstrate that the trithiobis (chloroalkylphenol) of this invention and the corresponding monothiobis(chloroalkylphenol) are both highly effective antioxidants, protecting the oil from oxidation for 902 and 1095 minutes, respectively. However, they also demonstrate that while the monothiobis(chloroalkylphenol) was not effective in preventing wear on the copper-lead bearing, the trithiobis(chloroalkylphenol) was very effective. Thus while 2,2'-thiobis(4-chloro-6-tert-butylphenol) allowed the copper-lead bearing to lose 1,007 mg., the loss accompanying the use of 2,2'-trithiobis (4-chloro-6-tert-butylphenol) was only 47 mg.

As noted, the residue resulting from the preparation and removal of 2,2'-thiobis(4-halo-6-alkylphenol) can be treated to yield 2,2' - trithiobis(4-halo-6-alkylphenol). The residue, as well as the trithiobis(haloalkylphenol), possesses the properties demonstrated in Table I, that is, both antioxidant and anti-wear properties.

The trithiobis(haloalkylphenols) of this invention are generally white solids. They are insoluble in water, soluble in hydrocarbon, ashless and non-volatile, thus facilitating their incorporation into a wide range of organic material. They have the formula:

I
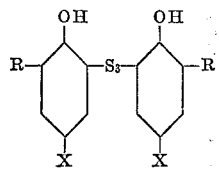

where R is an alkyl radical having from 3 to about 12 carbon atoms and which is branched on the alpha carbon atom and X is a halogen such as fluorine, chlorine, bromine or iodine.

Examples of the compounds of this invention include: 2,2'-trithiobis [4-chloro-6-(2-hexyl)phenol]; 2,2'-trithiobis [4-bromo-6-(2-nonyl)phenol]; 2,2'-trithiobis(4-chloro-6 - isobutylphenol); 2,2'-trithiobis(4-iodo-6-tert-octylphenol); 2,2'-trithiobis[4-chloro-6-(3-decyl)phenol]; 2,2'-trithiobis(4-fluoro-6-isopropylphenol); 2,2'-trithiobis(4-iodo-6-isoamylphenol); 2,2'-trithiobis(4-chloro-6-isopropylphenol); 2,2'-trithiobis(4-chloro-6-tert-butylphenol); 2,2'-trithiobis(4-bromo-6-sec-butylphenol); 2,2'-trithiobis[4-fluoro-6-(4-dodecyl)phenol]; 2,2'-trithiobis[4-iodo-6-(2-undecyl)phenol]; and 2,2'-trithiobis-[4-bromo-6-(2-heptyl)phenol].

The preferred compounds of this invention are those in which halogen is chlorine and the most preferred compound of this invention is 2,2'-trithiobis-(4-chloro-6-tert-butylphenol). This compound is a most superior antioxidant and anti-wear agent in lubricating oil and is a highly effective antioxidant in other organic media.

As noted, the compounds and additive materials of this invention are prepared by reacting a 4-halo-6-alkylphenol with a sulfur chloride, and removing monothiobis-(4-chloro-6-alkylphenol). In carrying out the process an inert solvent is employed. Suitable solvents for this purpose include: hydrocarbons such as petroleum ether, hexane, isooctane, benzene, toluene, xylene, pseudocumene, etc., inert chlorinated hydrocarbons such as carbon tetrachloride, chloroform, trichloroethylene, chlorobenzene, ethylene dichloride, etc.; nitro hydrocarbons such as nitromethane, nitrobenzene, etc.; and the like. The choice of solvent should be such that the particular reactants employed will be dissolved therein sufficiently to react effectively under the particular reaction conditions. The sulfur chloride used can be sulfur monochloride or sulfur dichloride although it is preferred to use sulfur dichloride.

The reactions can be conducted conveniently from 0 to 100° C. at reaction times of from a few minutes to about a day or more, such that the particular phenolic reactant chosen will effectively react to form the desired product as described above. Reaction temperatures of from 15 to 55° C. have been found to be most convenient giving high yields in a reasonable time.

The reactions can be conducted in an open vessel. In commercial operations where recovery of hydrochloric acid by-product is desired, the reaction may be conducted in a vessel equipped with such recovery means. Further, a nitrogen sweep may be used to aid in removal of the hydrochloric acid.

The reaction mass can be treated by several methods to remove the 2,2'-monothiobis-(4-halo-6-alkylphenol). Thus the reaction mass may be distilled to remove some solvent and the residue recrystallized from a different solvent to precipitate the monothiobis-(chloroalkylphenol). The compound may then be removed by filtration. Another method that can be used is to seed the reaction mass with crystals of the monothiobis-(haloalkylphenol).

The residue, or mother-liquor, obtained by the above process can be used very effectively by itself in various organic media without need of further purification. However, increased effectiveness in antioxidant and anti-wear properties is achieved by further treating the mother-liquor to obtain a 2,2'-trithiobis-(4-halo-6-alkylphenol). For example, one can concentrate the mother-liquor, after removal of the precipitated 2,2'-monothiobis-(4-halo-6-alkylphenol), wash with an aqueous alkaline solution, dry and strip the volatiles and finally recrystallize the 2,2'-thiobis-(4-halo-6-alkylphenol). In general all that need be done is to first effectively remove the monothiobis-(haloalkylphenol). The residue will then contain a high relative concentration of trithiobis-(haloalkylphenol) which is then readily separable by contacting or triturating it with a solvent. Further recrystallization will further purify the product. It is to be understood, of course, that various other work-up procedures can be devised which are satisfactory. The following examples illustrate the additive materials of this invention and their preparation.

*Example 1*

In a reaction vessel equipped with stirring means, heating means, and temperature measuring means, was placed a solution of 370 parts of 4-chloro-6-tert-butylphenol and 79 parts of n-hexane. The solution was stirred at 18–20° C. and one-half of a solution of 10.3 parts of sulfur dichloride and 198 parts of n-hexane were added over a 20 minute period. After stirring for one hour, the remainder of the sulfur dichloride was added over another 20 minute period. The agitation was conducted for 2½ hours while the temperature was controlled at 22–25° C.

During the agitation of the sulfur dichloride, hydrogen chloride gas was evolved. The reaction mixture was stirred overnight and then heated for a ½ hour period at 35° C. The solvent was removed by distillation and the residue then distilled at one milliliter pressure at 100° C. The residue from this distillation was recrystallized from iso-octane whereupon 2,2'-thiobis-(4-chloro-6-tert-butylphenol), having a melting point of 110–111° C., precipitated. The residue was filtered to remove this compound and then concentrated by evaporation. It was washed with aqueous sodium bicarbonate solution, dried and stripped of volatiles. The residue was taken up in n-hexane leaving a solid material which was filtered and recrystallized from n-hexane to leave white solid 2,2'-trithiobis-(4-chloro-6-tert-butylphenol) having a melting point of 137.5–139.5° C. Analysis: Calculated for $C_{20}H_{24}O_2S_3Cl_2$: 20.75 percent sulfur, 15.3 percent chlorine. Found: 20.5 percent sulfur, 15.5 percent chlorine.

Both the residue obtained after precipitation and removal of 2,2'-thiobis-(4-chloro-6-tert-butylphenol), and the 2,2'-trithiobis-(4-chloro-6-tert-butylphenol) obtained as the final product have exceptional antioxidant and anti-wear properties.

Good results are also obtained when other 4-halo-6-alkylphenols are reacted with a sulfur chloride in the above manner. Thus, 4-bromo-6-isopropylphenol can be reacted with sulfur monochloride, using carbon tetrachloride as a solvent to yield, after separation of monosulfide produced, a residual material having antioxidant and anti-wear properties. This residual material may be further treated to yield 2,2'-trithiobis-(4-bromo-6-isopropylphenol) which also has superior antioxidant and anti-wear properties. Likewise, 4-iodo-6-sec-butylphenol can be reacted with sulfur dichloride, using benzene as a solvent, to yield, after the above separation procedures, an effective residual oil and upon further treatment 2,2'-trithiobis-(4-iodo-6-sec-butylphenol). Similarly 4-chloro-6-isoamyl phenol can be reacted with sulfur dichloride, using nitrobenzene as a solvent, in the above manner and, after the above separation procedures, a residual material is produced which, upon further treatment yields 2,2'-trithiobis-(4-chloro-6-isoamylphenol). Also 4-bromo-6-(2-hexyl)phenol can be reacted following the above procedure to yield a residual material which upon further purifying yields 2,2'-trithiobis[4-bromo-6-(2-hexyl)phenol].

*Example 2*

Following the general procedure of Example 1, 4-bromo-6-(2-dodecyl)phenol is reacted with sulfur dichloride at a maximum temperature of 40° C. and a total reaction time of 24 hours, using toluene as a solvent to precipitate 2,2'-thiobis-[4-bromo-6-(2-dodecyl)phenol]. One mole of the sulfur dichloride is employed for each mole of the phenol in this reaction. Sufficient solvent is employed to insure a reaction mass which may be agitated. The 2,2'-thiobis[4-bromo-6-(2-dodecyl)phenol] is filtered and the mother-liquor is concentrated by evaporation, washed with dilute aqueous potassium hydroxide, dried and stripped of volatiles. The residue thus obtained is found to be an effective antioxidant and anti-wear agent. The residue is further treated by dissolving it in petroleum ether, separating solids, remaining and recrystallizing the solids from xylene to give 2,2'-trithiobis[4-bromo-6-(2-dodecyl)phenol].

Good results are also obtained when 4-chloro-6-(3-octyl)phenol is reacted with sulfur dichloride at 0° C. The residual material obtained after removal of the monosulfide precipitate, possesses good antioxidant properties and is further treated, as in the above example, to yield 2,2' - trithiobis[4-chloro-6-(3 - octyl)phenol]. Similarly 4-chloro-6-(2-heptyl)phenol can be reacted with sulfur monochloride at a temperature of 100° C. and a reaction time of 2 minutes to yield, after separation of the monosulfide, a residual material which can be further purified to yield 2,2'-trithiobis-[4-chloro-6-(2-heptyl)phenol]. Likewise, 4-iodo-6-isobutylphenol can be reacted with sulfur dichloride to yield, after precipitation of the monosulfide a residual material having effective anti-wear properties and upon purification 2,2'-trithiobis-(4-iodo-6-isobutylphenol) which also possess outstanding anti-wear properties.

*Example 3*

In the reaction vessel of Example 1, 2 moles of 4-iodo-6-isopropylphenol are reacted with one mole of sulfur dichloride at a maximum temperature of 30° C. The sulfur dichloride is in n-hexane solution and is added to the phenol which is also dissolved in n-hexane. Following the procedure of Example 1, 2,2'-thiobis(4-iodo-6-isopropylphenol) is precipitated and removed by filtration. The mother-liquor is evaporated, washed with dilute aqueous sodium hydroxide, dried and stripped of volatiles. The resultant residue is an anti-wear agent and is further treated by dissolving it in isooctane and filtering and recrystallizing the undissolved solids from benzene to yield 2,2'-trithiobis-(4-iodo-6-isopropylphenol).

Following the above procedure 4-chloro-6-tert-octylphenol is reacted with sulfur dichloride at a maximum temperature of 65° C. for 2 hours to yield after filtration and removal of the monosulfide, a residual material, which can be further purified to yield 2,2'-trithiobis-(4-chloro-6-tert-octylphenol). Likewise, 4-iodo-6-(3-nonyl)-phenol can be reacted with sulfur dichloride in a hydrocarbon solvent at 15° C. for 3 hours to yield, after precipitation and removal of the monosulfide, a mother-liquor which can be further purified to yield 2,2'-trithiobis[4-iodo-6-(3-nonyl)phenol]. Similarly, 4-bromo - 6(4 - decyl)phenol can be reacted with sulfur dichloride to yield, as a final purified product, 2,2'-trithiobis[4-bromo-6-(4-decyl)phenol].

The compounds of this invention are outstanding antioxidants. Therefore, an embodiment of this invention is a new composition of matter which comprises organic material normally tending to undergo oxidative deterioration in the presence of air, oxygen, or ozone, containing an appropriate quantity from 0.001 up to about 5 percent, and preferably from about 0.01 to about 2 percent of a product of this invention.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced against both oxidation and wear by the practice of this invention. The addition of small quantities of the compounds of this invention to such materials as turbine, hydraulic, transformer and other highly refined industrial oils, waxes, soaps and greases, plastics, synthetic polymers such as polyethylene and polypropylene, organometallic compositions such as tetraethyllead and tetraethyllead antiknock fluids, elastomers (including natural rubber), crankcase lubricating oils, lubricating greases, and the like, greatly increase their resistance to deterioration in the presence of air, oxygen or ozone.

The compounds of this invention are very useful in protecting petroleum wax—paraffin wax and micro-crystalline wax—against oxidative deterioration. They also find use in the stabilization of edible fats and oils of animal or vegetable origin which tend to become rancid especially during long perods of storage because of oxidative deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus, one embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

The compounds of this invention are also useful in preventing oxidative deterioration and wear in lubricating oil compositions. Thus, a preferred embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.01 to about 2 percent—of a compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperature.

The finished lubricants of this invention have much greater oxidation stability anti-wear properties and many other improved performance characteristics as compared with the corresponding base oils. The following examples illustrate the preferred lubricating oil compositions of this invention.

*Example 4*

To 1,000 parts of a solvent refined neutral oil (95 V.I. and 200 SUS at 100° F.) containing 6 percent of a commercial methacrylate type V.I. approver which gives the finished formulation a V.I. of 140 and a viscosity of 300 SUS at 100° F. is added 5 percent of 2,2'-trithiobis-(4-chloric-6-tert-butylphenol).

*Example 5*

To an additive-free solvent refined crankcase lubricating oil having a viscosity index of 95 and an SAE viscosity of 10 is added 0.001 percent of 2,2'-trithiobis(4-chloro-6-isopropylphenol).

*Example 6*

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 10 parts of 2,2'-trithiobis-[4-bromo-6-(2-dodecyl)phenol]. The resulting oil possesses greatly enhanced resistance to oxidative deterioration.

*Example 7*

To 100,000 parts of a commercially available pentaerythritol ester having a viscosity at 100° F. of 22.4 centistokes, and known in the trade as "Hercoflex 600" is added 400 parts (0.4 percent) of the residual material of Example 1. The resulting finished oil possesses markedly improved resistance against oxidative deterioration.

*Example 8*

To 100,000 parts of dioctyl sebacate having a viscosity of 210° F. of 36.7 SUS, a viscosity index of 159 and a molecular weight of 426.7 is added 250 parts (0.25 percent) of 2,2'-trithiobis-(4-iodo-6-isoamylphenol).

The compounds of this invention are also useful as additives to functional fluids and automatic transmission fluids. The primary constituent of a functional fluid is a refined mineral lubricating oil having carefully selected minimum viscosity of 49 Saybolt Universal seconds SUS at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicyclic acid, and alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together while heating the oil to a temperature up to 200° F.

*Example 9*

A fluid of this invention is prepared by blending 80 parts of a conventionally-refined Pennsylvania mineral oil (99 SUS at 100° F.), 2 parts of the residual material of Example 2, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity at 60/60° F. of 0.919.

*Example 10*

Another such fluid consists of 95 parts of a solvent-refined, light acid-treated, clay-contacted, solvent dewaxed paraffin base distillate mineral oil (110 SUS at 100° F.), 0.1 part of 2,2'-trithiobis[4-fluoro-6-(2-heptyl)phenol], 0.1 part of calcium octyl phenol sulfide, 2 parts of a sulfurized sperm oil having a sulfur content between 10–12 percent, a viscosity of 210° F. of 200 SUS and a pour point of 65° F., 0.3 part of an ester of an aromatic acid and wax-alkylated phenol having a molecular weight of approximately 450: 2.5 parts of a linear pale color isobutylene polymer of a controlled molecular weight having a viscosity of 3,000 SUS at 210° F., a specific gravity at 60/60° F. of 0.875.

Liquid hydrocarbon fuels employed in the operation of spark ignition combustion engines are also vastly improved in their storage stability by the practice of this invention. The following examples illustrate compositions of typical commercial gasolines which may be stabilized against oxidative deterioration by the inclusion therein of a compound of this invention.

*Example 11*

To 1,000 parts of a gasoline containing 26.6 percent aromatics, 20.8 percent olefins, 52.6 percent saturates, and an API gravity of 62.1° is added 10 parts of 2,2'-trithiobis-(4-chloro-6-isobutylphenol).

*Example 12*

To 10,000 parts of a gasoline containing 8.6 percent aromatics, 7.9 percent olefins, 83.5 percent saturates and an API gravity of 68.5° is added 500 parts of the residual material of Example 3.

As noted in the preceding examples, the compounds of this invention are excellent antioxidants and anti-wear agents. This ability to prevent oxidation and deterioration of organic media is completely unexpected since seemingly similar compounds show little or no such antioxidant activity.

I claim:
1. A compound having the formula:

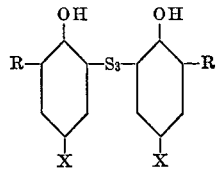

where R is an alkyl radical having from 3 to about 12 carbon atoms and which is branched on the alpha carbon atom and X is halogen.

2. The compound of claim 1 wherein said halogen is chlorine.
3. 2,2'-trithiobis-(4-chloro-6-tert-butylphenol).
4. Organic material normally tending to undergo oxidative deterioration containing as an antioxidant therefor from 0.001 to about 5 percent of a compound of claim 1.
5. The composition of claim 4 wherein said organic material is a lubricating oil.
6. Lubricating oil normally tending to undergo oxidative deterioration containing as an antioxidant therefor from 0.001 to about 5 percent of 2,2'-trithiobis-(4-chloro-6-tert-butylphenol).
7. Organic material normally tending to undergo oxidative deterioration selected from the group consisting of liquid hydrocarbon fuels, petroleum derived hydrocarbon lubricants, synthetic diester lubricants, functional fluids, synthetic polymers, natural rubber, synthetic rubber, and edible fats and oils, containing, as an antioxidant therefor, from 0.001 to about 5 percent of a compound of claim 1.
8. Organic material normally tending to undergo oxidative deterioration selected from the group consisting of liquid hydrocarbon fuels, petroleum derived hydrocarbon lubricants, functional fluids, synthetic rubber and synthetic polymers, containing, as an antioxidant therefor, from 0.001 to about 5 percent of a compound of claim 1.
9. Organic material normally tending to undergo oxidative deterioration selected from the group consisting of liquid hydrocarbon fuels, petroleum derived hydrocarbon lubricants, polypropylene and polyethylene, containing, as an antioxidant therefor, from 0.001 to about 5 percent of a compound of claim 1.

References Cited by the Examiner

UNITED STATES PATENTS

| | | | |
|---|---|---|---|
| 2,209,463 | 7/1940 | Lieber et al. | 252—48.2 |
| 3,092,585 | 6/1963 | Orloff | 252—48.4 |
| 3,102,798 | 9/1963 | Orloff | 252—404 |

FOREIGN PATENTS 498,046  1/1939  Great Britain.

DANIEL E. WYMAN, *Primary Examiner.*